United States Patent
Rosén

(10) Patent No.: US 10,428,855 B2
(45) Date of Patent: Oct. 1, 2019

(54) BOLT ARRANGEMENT, COUPLING ARRANGEMENT AND METHOD TO DISMOUNT A COUPLING ARRANGEMENT

(71) Applicant: Aktiebolaget SKF, Gothenburg (SE)

(72) Inventor: Erik Rosén, Gaevle (SE)

(73) Assignee: Aktiebolaget SKF, Göteborg (SE)

( * ) Notice: Subject to any disclaimer, the term of this patent is extended or adjusted under 35 U.S.C. 154(b) by 168 days.

(21) Appl. No.: 15/794,775

(22) Filed: Oct. 26, 2017

(65) Prior Publication Data
US 2018/0128300 A1   May 10, 2018

(30) Foreign Application Priority Data
Oct. 26, 2016   (DE) .................. 10 2016 221 119

(51) Int. Cl.
| | |
|---|---|
| *F16B 19/02* | (2006.01) |
| *F16B 7/14* | (2006.01) |
| *F16B 23/00* | (2006.01) |
| *F16B 5/02* | (2006.01) |
| *F16B 27/00* | (2006.01) |
| *F16B 37/04* | (2006.01) |

(52) U.S. Cl.
CPC ............ *F16B 19/02* (2013.01); *F16B 5/0258* (2013.01); *F16B 5/0275* (2013.01); *F16B 7/149* (2013.01); *F16B 23/0061* (2013.01); *F16B 23/0069* (2013.01); *F16B 27/00* (2013.01); *F16B 37/042* (2013.01); *F16B 37/046* (2013.01)

(58) Field of Classification Search
CPC ........ F16B 5/02; F16B 5/0258; F16B 5/0275; F16B 7/149; F16B 23/0061; F16B 23/0069; F16B 31/06; F16B 31/043
See application file for complete search history.

(56) References Cited

U.S. PATENT DOCUMENTS

| | | | | |
|---|---|---|---|---|
| 3,298,725 A | * | 1/1967 | Boteler | B61F 5/26 403/282 |
| 4,192,621 A | * | 3/1980 | Barth | F16B 31/043 403/15 |
| 4,303,150 A | * | 12/1981 | Olsson | B23B 31/305 188/367 |
| 4,326,826 A | * | 4/1982 | Bunyan | B23P 19/067 411/339 |
| 4,496,259 A | * | 1/1985 | Foucher | B61F 5/26 403/14 |
| 4,800,644 A | * | 1/1989 | Muellenberg | F16D 1/093 29/525.08 |

(Continued)

*Primary Examiner* — Daniel J Wiley
(74) *Attorney, Agent, or Firm* — Bryan Peckjian; SKF USA Inc. Patent Dept.

(57) ABSTRACT

A bolt arrangement that includes a bolt having an outer circumferential peripheral surface extending in a longitudinal direction of the bolt, and a sleeve providing an outer circumferential peripheral surface and an inner circumferential peripheral surface extending in a longitudinal direction of the sleeve. The inner peripheral surface has a tapering profile in its longitudinal direction. A portion of the outer peripheral surface of the bolt provides a corresponding tapering profile matching the tapering profile of the inner peripheral surface of the sleeve. Furthermore, the inner peripheral surface of the sleeve further includes a groove. A coupling arrangement and a method of dismounting a coupling arrangement is also provided.

10 Claims, 3 Drawing Sheets

(56) References Cited

U.S. PATENT DOCUMENTS 5,947,610 A * 9/1999 Feldbauer ............... F16C 13/02
  384/107
6,840,726 B2 * 1/2005 Gosling ............... B23P 11/022
  403/31

* cited by examiner

BOLT ARRANGEMENT, COUPLING ARRANGEMENT AND METHOD TO DISMOUNT A COUPLING ARRANGEMENT

CROSS-REFERENCE

This application claims priority to German patent application no. 102016221119.6 filed on Oct. 26, 2016, the contents of which are fully incorporated herein by reference.

TECHNOLOGICAL FIELD

According to a first aspect, the present disclosure relates to a bolt arrangement for connecting at least two mechanical elements. According to a second aspect, the present disclosure relates to a coupling arrangement. According to a third aspect, the present disclosure relates to a method for dismounting a coupling arrangement.

BACKGROUND

To mechanically fix separate mechanical elements one can for example make use of bolt arrangements, comprising bolts and nuts. There are several available designs of bolt and nut connections, such as bolts with and without bolt heads, bolts with cylindrical or tapered shanks, bolts with one or several threads etcetera. One example of a bolt arrangement for connecting two separate mechanical elements is a bolt presenting a central tapered shank with external male threads on each side of the shank. In addition, the bolt arrangement presents a sleeve presenting an internal tapered surface in which the bolt is meant to be driven in to and thereby a radial press-fit is created between the corresponding tapered surfaces. Two separate mechanical elements can then be fixed together by mounting the bolt arrangement in aligned through-holes of the mechanical elements. By driving up the sleeve on the central shank, i.e. axially displacing the two components relative each other, a radial force will pressurize the surfaces between the bolt, the sleeve and the inner surfaces of the through-holes. This will lead to that the two mechanical elements will be fixed together due to the friction force acting between the components. In addition, to further strengthen the connection, the bolt extends outside each external side of the two through-holes and nuts are connected at said sides via threaded connections between the bolt and the nuts. Thereby the bolt arrangement will result in a very solid and firm connection of the two mechanical elements. To release the connection the nuts have to be released and also the tapered connection between the sleeve and the shank has to be released by driving off the sleeve from the shank. The release of the sleeve from the shank can e.g. be facilitated by introducing a pressurized fluid, e.g. oil, between the mating surfaces to thereby create a fluid film between said surfaces and thereby eliminating the friction force between the components. To facilitate the introduction of the oil it is known to make use of a helical groove on the central shank in which the oil can be distributed in order to create the fluid film in-between said surfaces.

SUMMARY

An object of the present disclosure is to provide an improved bolt and coupling arrangement which provides a reliable and firm connection and which also provides a reliable dismounting operation.

The object is achieved by the subject matter as defined in the independent claims.

Alternative and preferred embodiments are disclosed in the dependent claims and in the accompanying description.

According to the first aspect, the object is achieved by a bolt arrangement for connecting at least two mechanical elements, wherein the bolt arrangement comprises a bolt presenting an outer circumferential peripheral surface extending in a longitudinal direction of the bolt, and a sleeve presenting an outer circumferential peripheral surface and an inner circumferential peripheral surface extending in a longitudinal direction of the sleeve. The inner peripheral surface of the sleeve has at least a tapering profile in its longitudinal direction, wherein a portion of the outer peripheral surface of the bolt presents a corresponding tapering profile essentially matching the tapering profile of the inner peripheral surface of the sleeve. Furthermore, the inner peripheral surface of the sleeve further presents a groove. In an embodiment, the groove is extending in the longitudinal direction of the sleeve. In an embodiment, the groove is one or several helical grooves that extend in the longitudinal direction of the sleeve.

Due to the design of providing the groove (which is meant for distributing a fluid between the mating surfaces for dismounting) on the sleeve instead of on the bolt surface, a more reliable dismounting will be accomplished. By moving the groove to the sleeve, the variation in relative position between the sleeve and the bolt will not affect the fluid (oil) distribution. It has namely been realized that when the groove is located on the bolt surface there may be situations when the sleeve and the bolt are relatively positioned such that there will be dry areas between the connecting surfaces of the sleeve and the bolt, i.e. the fluid film will not be present along the complete extension of the sleeve. In prior art designs, if for instance the sleeve is located relative the bolt groove such that the groove is far from one of the axial ends of the sleeve, that side of the sleeve may be dry during the dismounting procedure. With the present invention, the groove on the sleeve can be machined close to the sleeve ends (without risk for leakage) and thereby minimize the risk for dry areas. The fluid will be equally allocated between sleeve and bolt, minimizing the risk of seizing (scratching), thus making the dismounting operation more reliable. In addition, when the groove is located on the bolt it has to extend over a shorter area compared to if the groove is located on the sleeve, since it has to be ascertained that the groove never extends outside the contacting area between the sleeve and the bolt. Thus, the sleeve groove can extend over a longer area compared to if the groove is located on the bolt.

Optionally, the longitudinal extension of the groove on the sleeve corresponds to at least 70%, 80%, 90%, or 95% of the longitudinal extension of the sleeve.

Optionally, the bolt further presents a fluid channel presenting an inlet and an outlet, and wherein the outlet is located at the portion of the outer peripheral surface which presents the tapering profile. In an embodiment, there is a groove connected to the outlet on the portion of the outer peripheral surface which presents the tapering profile. The groove may facilitate the distribution of the fluid. In a further embodiment, the groove is oriented such that it is encircling the circumference of the said portion. In a further embodiment, said groove is located at a distance from the ends of said portion such that there is no risk of leakage of fluid from the area where the sleeve will be located.

Optionally, the portion of the outer peripheral surface of the bolt which presents the tapering profile is an essentially smooth surface. In an embodiment, by smooth surface it is meant that there is no groove that extends in an essential part of the longitudinal extension of said portion. Instead, there may only be one groove encircling the portion that is connected to the outlet. Thus, in an embodiment, there is no groove on said portion that extends in the longitudinal extension of said portion of the bolt, i.e. the portion is an essentially smooth surface.

Optionally, the outer peripheral surface of the bolt further presents an external male thread on at least one axial side of the portion which presents the tapering profile.

Optionally, the bolt arrangement further comprises at least one nut presenting an internal female thread which is matching the external male thread.

Optionally, the groove presents a radial depth being 1-50%, preferably 5-25% or more preferably 8-12% of the radial sleeve thickness. Sleeve thickness is meaning the wall thickness of said sleeve, i.e. a radial distance from the outer peripheral surface to the inner peripheral surface of said sleeve.

Optionally, the groove presents a width which is 0.5-5 millimeters (mm) or preferably 1-2 mm With groove width is meant a width measured perpendicular to the longitudinal direction of the groove.

Optionally, the at least one helical groove presents a helical groove pitch which is 5-50 mm or preferably 10-20 mm. A helical groove pitch is defined as the height of one complete helix turn, measured parallel to the axis of the helix. In a further embodiment, there may be more than one helical groove, such as two, three or four grooves located in the sleeve.

According to the second aspect of the disclosure, the object is achieved by a coupling arrangement, which comprises at least one bolt arrangement according to the first aspect of the disclosure, a first mechanical element presenting at least a first hole, said first hole being a through-hole, and a second mechanical element presenting at least a second hole. The first and second holes are aligned and the at least one bolt arrangement is at least partly located in the first and second holes for mechanically fixing the first and second elements together. It shall be noted that all embodiments of the second aspect of the disclosure can be combined with any of the embodiments of the first aspect of the disclosure and vice versa. In an embodiment, the second hole is a through-hole. In an alternative embodiment, the second hole is blind hole, i.e. the hole presents an opening and a bottom. Said hole may in an embodiment present an internal female thread which is meant to be in threaded connection with the bolt.

Due to the new design an improved coupling arrangement will be accomplished, which will provide a more reliable dismounting of the coupling. As stated above, by moving the groove to the sleeve, the variation in position between the sleeve and the bolt will not affect the fluid (oil) distribution and thus a fluid film will be created along the complete extension of the sleeve. The groove on the sleeve can be machined close to the sleeve ends (without risk for leakage) and thereby minimize the risk for dry areas. The fluid will be equally allocated between sleeve and bolt, minimizing the risk of seizing (scratching), thus making the dismounting operation more reliable.

According to the third aspect of the disclosure, the object is achieved by a method for dismounting a coupling arrangement according to the second aspect of the disclosure. The first and second mechanical elements are mechanically fixed by the bolt arrangement due to at least a radial force which acts between the bolt, the sleeve and the first and second mechanical elements. The radial force has been created when the tapering surface of the bolt has been axially driven in to the corresponding tapering profile of the sleeve. In the method, the first and second mechanical elements are released from each other after introducing a pressurized fluid in the sleeve groove.

As already mentioned hereinabove, a more reliable dismounting operation will be accomplished due to that the groove has been positioned on the sleeve instead of on the bolt.

BRIEF DESCRIPTION OF THE DRAWINGS

Exemplifying embodiments of the present disclosure and one example of a prior art bolt arrangement will now be described in more detail, with reference to the accompanying drawings, wherein:

FIG. 1 illustrates a prior art bolt arrangement.

Figure 2:
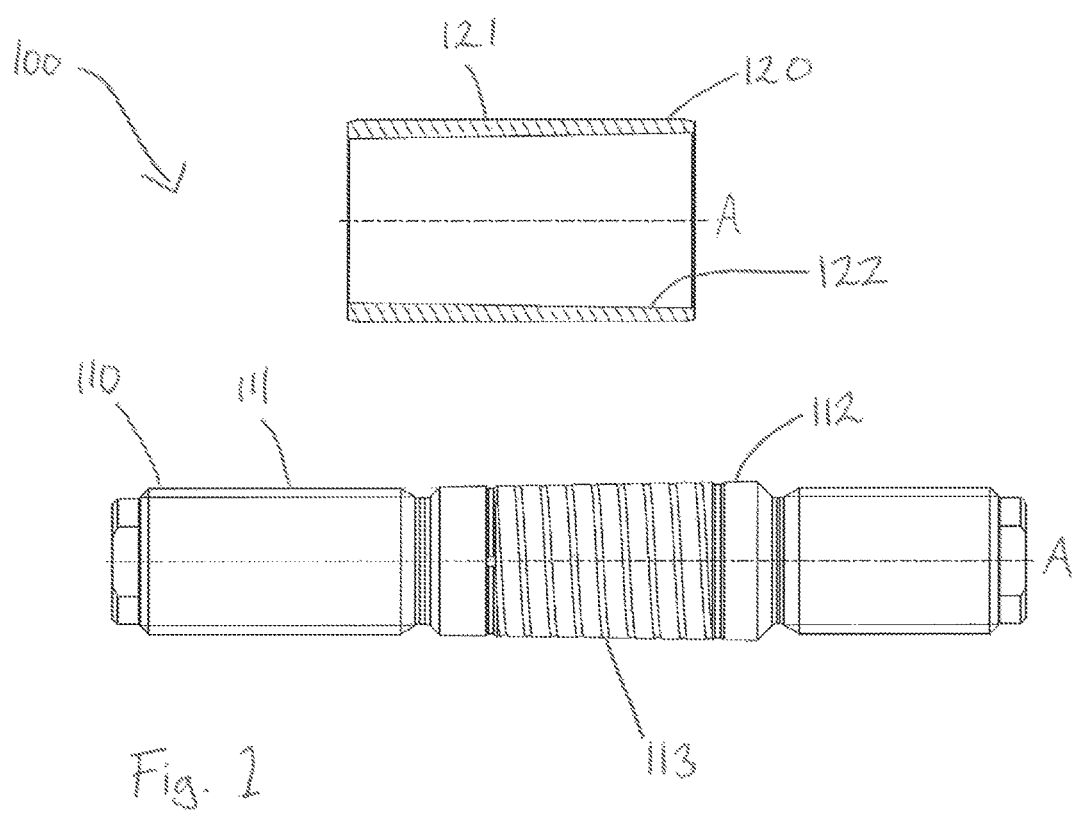
FIG. 2 illustrates a bolt arrangement according to an embodiment of the invention.
Figure 2:
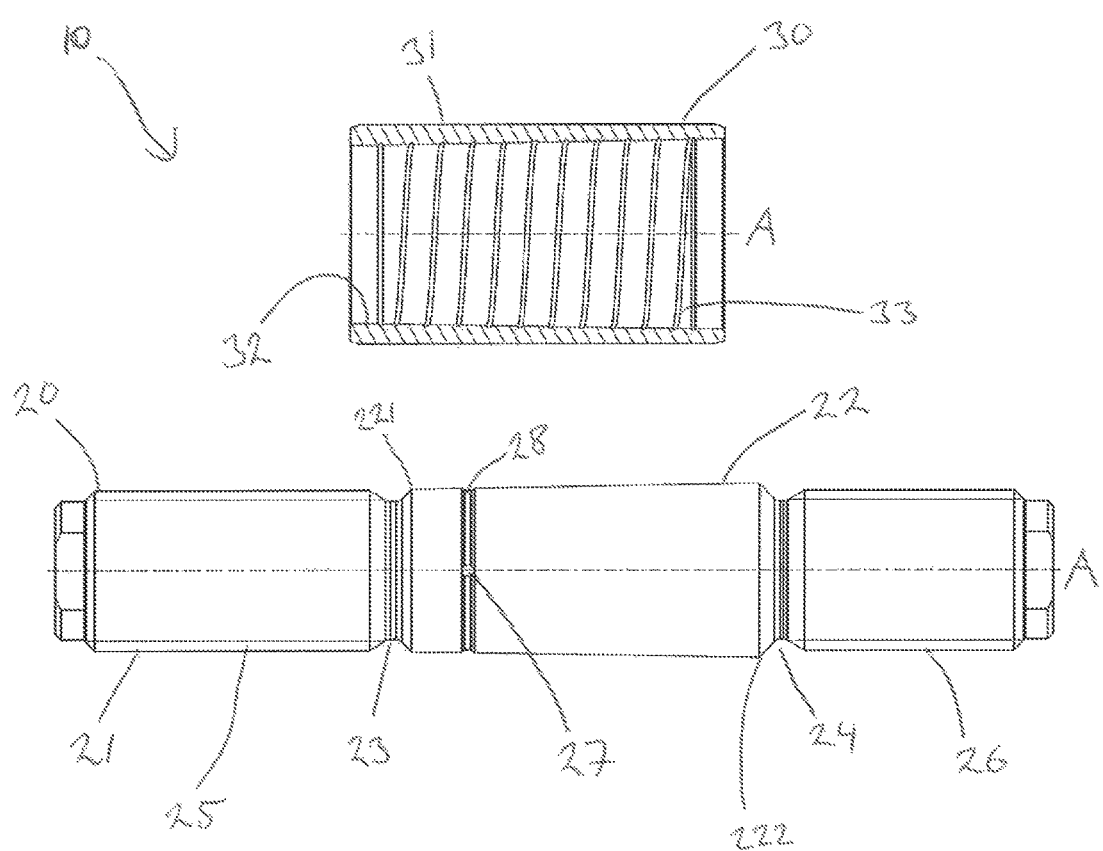

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure.

DETAILED DESCRIPTION

FIG. 1 shows a bolt arrangement 100 as already known in the art. The bolt arrangement 100 is meant for connecting at least two mechanical elements (not shown), wherein the bolt arrangement 100 comprises a bolt 110 presenting an outer circumferential peripheral surface 111 extending in a longitudinal direction A of the bolt 110, and a sleeve 120 presenting an outer circumferential peripheral surface 121 and an inner circumferential peripheral surface 122 extending in a longitudinal direction A of the sleeve 120. The inner peripheral surface 122 has a tapering profile in its longitudinal direction A, wherein a portion 112 of the outer peripheral surface 111 of the bolt 110 presents a corresponding tapering profile essentially matching the tapering profile of the inner peripheral surface 122 of the sleeve. Furthermore, the portion of the outer peripheral surface 112 of the bolt 110 further presents a helical groove 113 extending in the longitudinal direction A of the bolt 110. With this design, when there is a helical groove 113 on the bolt 110 there is a risk that fluid may leak out from the sides if the sleeve 120 is not positioned correctly. In addition, this design may lead to that there may be dry areas between the sleeve 120 and the bolt 110 when dismounting said parts, i.e. there may not be a fluid film built up in the complete area between the connecting surfaces. As can be seen in this illustration, the inner surface 122 of the sleeve 120 is a smooth surface.

Now turning to FIG. 2, a bolt arrangement 10 according to an embodiment of the present invention can be seen. The bolt arrangement 10 is meant for connecting at least two mechanical elements (not shown), wherein the bolt arrangement 10 comprises a bolt 20 presenting an outer circumferential peripheral surface 21 extending in a longitudinal direction A of the bolt 20, and a sleeve 30 presenting an outer circumferential peripheral surface 31 and an inner circumferential peripheral surface 32 extending in a longitudinal direction A of the sleeve 30. The inner peripheral surface 32 has a tapering profile in its longitudinal direction A, wherein a portion 22 of the outer peripheral surface 21 of the bolt 20 presents a corresponding tapering profile essentially matching the tapering profile of the inner peripheral surface 32 of the sleeve 30. The portion 22 is an essentially smooth surface without e.g. any helical groove that extends along said portion 22. Furthermore, the inner peripheral surface 32 of the sleeve presents a groove 33 extending in the longitudinal direction A of the sleeve. In this embodiment, the groove 33 is a helical groove which extends in the longitudinal direction A of the sleeve 30. As further can be seen, the bolt 20 presents a first and second waist portion 23 and 24 on each respective side of the portion 22. In another embodiment, there are no waist portions on the bolt 20. Further, on each respective sides of the portion 22 of the bolt 20 are male threaded portions 25 and 26 positioned. Said threaded portions 25 and 26 are meant to receive nuts (not shown) with corresponding female threaded connections. The bolt 20 in this embodiment further presents a fluid outlet 27 on the portion 22, wherein the outlet 27 is connected to a groove 28 which encircles the circumference of the portion 21. As can be seen, the groove 28 is located a distance from ends 221 and 222 of the portion 22, thus minimizing the risk of leakage. In an embodiment, said groove 28 is located a distance from at least one of the ends 221 and 222 which is equal to at least 5%, 10%, 15%, 20%, 25%, 30%, 35%, 40%, 45% or 50% of the total distance between said ends 221 and 222. With this design of the bolt arrangement 10, the helical groove 33 can be positioned close to the ends of the sleeve 30 without the risk of fluid leakage during dismounting of the bolt arrangement 10. In addition, the risk of dry areas, which can lead to scratches and other damage of the components, is minimized.

Figure 3:
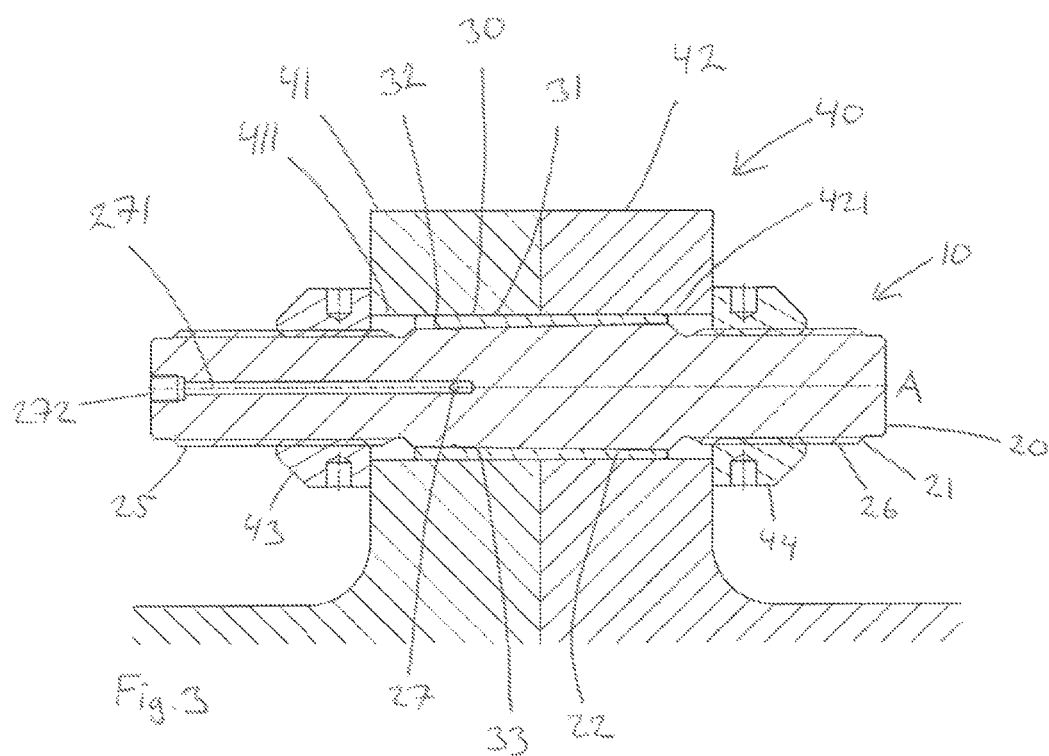
FIG. 3 illustrates a coupling arrangement according to an embodiment of the invention.

FIG. 3 shows a coupling arrangement 40 according to an embodiment of the present invention. The coupling arrangement 40 comprises at least one bolt arrangement 10 according to the first aspect of the disclosure, a first mechanical element 41 presenting at least a first through-hole 411 and a second mechanical element 42 presenting at least a second through-hole 421. The first and second through-holes 411 and 421 are aligned along a longitudinal direction A and the at least one bolt arrangement 10 is at least partly located in the first and second through-holes 411 and 421 for mechanically fixing the first and second elements 41 and 42 together. The bolt arrangement comprises a bolt 20 presenting an outer circumferential peripheral surface 21 extending in a longitudinal direction A of the bolt 20, and a sleeve 30 presenting an outer circumferential peripheral surface 31 and an inner circumferential peripheral surface 32 extending in a longitudinal direction A of the sleeve 30. The inner peripheral surface 32 has a tapering profile in its longitudinal direction A, wherein a portion 22 of the outer peripheral surface 21 of the bolt 20 presents a corresponding tapering profile essentially matching the tapering profile of the inner peripheral surface 32 of the sleeve 30. The portion 22 is an essentially smooth surface without e.g. any helical groove that extends along said portion 22. Furthermore, the inner peripheral surface 32 of the sleeve further presents a groove 33 extending in the longitudinal direction A of the sleeve. In this embodiment, the groove 33 is a helical groove which extends in the longitudinal direction A of the sleeve 30. Further, on each respective sides of the portion 22 of the bolt 20 are male threaded portions 25 and 26 positioned. Said threaded portions 25 and 26 are meant to receive nuts 43 and 44 with corresponding female threaded connections. The bolt 20 in this embodiment further presents a fluid outlet 27 on the portion 22, wherein the outlet 27 is connected to a groove 28 (not shown) which encircles the circumference of the portion 22. The outlet 27 is connected to a fluid channel 271 which also comprises an inlet 272 at one of the ends of the bolt 20. Through this channel 271 can pressurized fluid (oil) be channeled during dismounting of the bolt arrangement 10. When the bolt 20 is driven in to the tapered surface 32 of the sleeve 30 the sleeve 30 will expand in the radial direction and thereby come into a gripping contact with the mechanical members 41 and 42. The driving of the bolt 20 into the sleeve 30 can e.g. be done by a hydraulic tool (not shown) that pushes on the sleeve 30 and pulls the bolt 20 such that the sleeve 30 is displaced axially relative the bolt 20 along the longitudinal direction A. To further strengthen the connection the two nuts 43 and 44 are fixed onto the bolt 20 by the threaded connections on each side of said bolt 20 to come in pressurized contact with the respective mechanical member 41 and 42. The coupling arrangement provides a more reliable coupling that minimizes the risk of damage during dismounting, as already described hereinabove.

During dismounting of the coupling arrangement 40 as shown in FIG. 3, first at least one of the nuts 43 and 44 is released by rotating said nut until there is created a small gap between the nut and the mechanical member 41 or 42. For safety reasons the nuts 43 and 44 should not be completely removed from the bolt 20 until the connection between the bolt 20 and the sleeve 30 is released. After at least one of the nuts 43 and 44 has been released to create said axial gap one can introduce pressurized fluid into the channel 271 and subsequently the sleeve 30 will be released from the tapered surface 22 of the bolt 20 due to the pressurized fluid. The fluid, which most likely is oil, will be distributed in the contact zone between the bolt 20 and the sleeve 30 by the groove 33 and create a fluid film, which will reduce the friction force between said components and minimize the risk of scratching.

Figure 4:
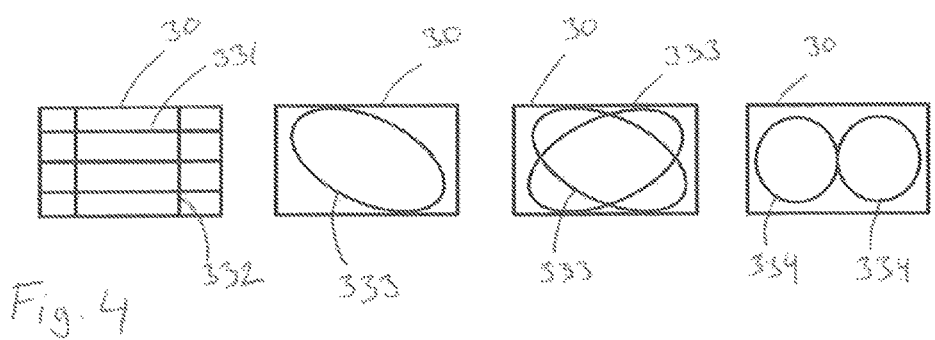
FIG. 4 shows four different embodiments of a sleeve according to the invention.

In FIG. 4, four cross sectional views of sleeves 30 according to the invention can be seen. The four different views are intended to show that the groove 33 in the sleeve 30 is not limited to be a helical groove. The groove 33 can be in several different forms. For example, in the illustration to the left, the sleeve presents straight grooves 331 extending in the longitudinal direction of the sleeve, as well as two lateral circular grooves 332 being essentially perpendicular to the longitudinal grooves. The sleeve 30 could in alternative embodiments comprise only longitudinal or lateral circular grooves, and also one or several such grooves 331 and 332. Further, in the two next illustrations, the sleeves 30 present oval shaped grooves 333. There may be one or several oval shaped grooves 333 on the sleeve 30, and further, said oval shapes may be oriented in different angles in said sleeve. At the utmost right side another example of a sleeve 30 can be seen, which shows that the groove 334 is designed to resemble the number eight. As can be understood by the skilled person, there may be several ways of arranging the grooves in said sleeve 30.

The invention is not limited to the embodiments and advantages as described and illustrated in this disclosure, but other embodiments and also modifications to the embodiments described are possible within the scope of the claims.

What is claimed is:
1. A bolt arrangement for connecting at least two mechanical elements, comprising:
   a bolt having an outer circumferential peripheral surface extending in a longitudinal direction of the bolt, a sleeve having an outer circumferential peripheral surface and an inner circumferential peripheral surface extending in a longitudinal direction of the sleeve, wherein the inner peripheral surface has at least a tapering profile in its longitudinal direction, wherein a portion of the outer peripheral surface of the bolt provides a corresponding tapering profile matching the tapering profile of the inner peripheral surface of the sleeve, wherein the inner peripheral surface of the sleeve further provides a groove, wherein the groove is a helical groove extending in the longitudinal direction of the sleeve.

2. The bolt arrangement according to claim 1, wherein the groove is extending in the longitudinal direction, and wherein the longitudinal extension of the groove corresponds to at least 70%, 80%, 90%, or 95% of the longitudinal extension of the sleeve.

3. The bolt arrangement according to claim 1, wherein the bolt further provides a fluid channel having an inlet and an outlet, and wherein the outlet is located at the portion of the outer peripheral surface that provides the tapering profile.

4. The bolt arrangement according to claim 1, wherein the portion of the outer peripheral surface of the bolt that includes the tapering profile is a smooth surface.

5. The bolt arrangement according to claim 1, wherein the outer peripheral surface of the bolt further includes an external male thread on at least one axial side of the portion that provides the tapering profile.

6. The bolt arrangement according to claim 5, wherein the bolt arrangement further comprises at least one nut having an internal female thread that matches the external male thread.

7. The bolt arrangement according to claim 1, wherein the groove includes a radial depth being 1-50% of the radial sleeve thickness.

8. The bolt arrangement according to claim 1, wherein the groove includes a width that is 0.5-5 millimeters (mm).

9. The bolt arrangement according got claim 1, wherein the helical groove provides a groove pitch which is 5-50 mm.

10. A coupling arrangement, comprising:
at least one bolt arrangement according to claim 1,
a first mechanical element having at least a first hole, the first hole being a through-hole
a second mechanical element having at least a second hole, wherein
the first and second holes are aligned, and wherein
the at least one bolt arrangement is at least partly located in the first and second holes for mechanically fixing the first and second elements together.

* * * * *